(No Model.)

E. M. BOYNTON.
SAW.

No. 373,581. Patented Nov. 22, 1887.

Witnesses
W. R. Williams
Wm. M. Terrell

Inventor
E. M. Boynton
by A. M. Wooster
attorney.

UNITED STATES PATENT OFFICE.

EBEN MOODY BOYNTON, OF WEST NEWBURY, MASSACHUSETTS.

SAW.

SPECIFICATION forming part of Letters Patent No. 373,581, dated November 22, 1887.

Application filed May 3, 1886. Serial No. 201,011. (No model.)

*To all whom it may concern:*

Be it known that I, EBEN MOODY BOYNTON, a citizen of West Newbury, State of Massachusetts, United States of America, have invented a new and useful Improvement in Saws, of which the following is a specification.

The use of saws has largely taken the place of axes, and any saving of time in filing and sharpening the former, especially in the forest, where it often has to be done, saves the time of men and teams. The shaping of the saw-teeth, especially the concaving of the same, if carefully used, will enable the sawyer to save time enough in using the first set of teeth to pay for the entire cost of the saw.

The object of my invention is to secure greater speed and ease in sawing, and especially crosscutting, wood and other fiber, by providing a saw-blade with concaved teeth of a peculiar character, hereinafter described, and by the same means to save time, files, and expense in repairing and sharpening the saw.

In order to make my invention more clearly understood, I have shown in the accompanying drawings a means for carrying it into effect.

In said drawings, Figures 1 to 5 represent side views of various forms of saw-teeth embodying my invention. Fig. 6 is an edge view of the form of tooth shown in Fig. 5.

A indicates the edges, $b$ the sides, and D the end, of the tooth, which is M-shaped in side elevation. The end D is hollowed out, as shown, so as to leave two cutting-points, $c$.

The concaves, hereinbefore referred to, are shown at $a$. They are formed in the edges of the teeth, so that the file in sharpening will touch only a comparatively small surface near the points and a great saving be effected in the time and cost of sharpening and repairing. The teeth also perform their work better in removing wood and in giving the dust clearance. Bevels $a'$ give the teeth acute points and side-cutting edges near the points.

Figure 3:
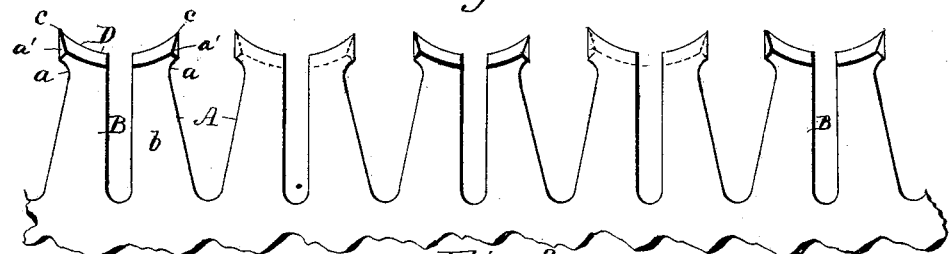

The teeth may be slotted, as shown at B, and especially in Fig. 3, by which ease of clearance and sharpening is further increased. The bottom of this slot is preferably curved to prevent fracture.

For small teeth the shape shown at K may be in some cases employed.

Figure 1:
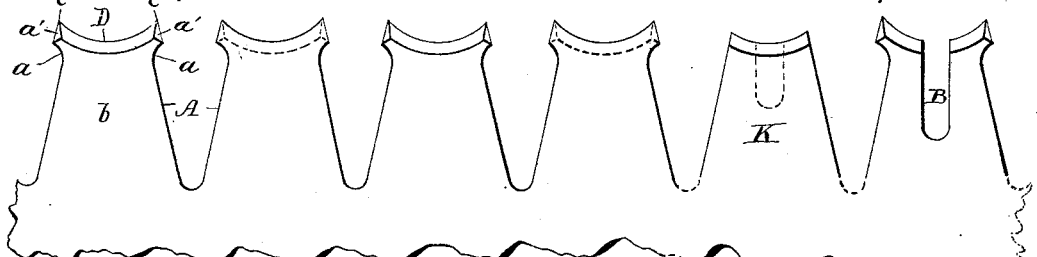
Figure 2:
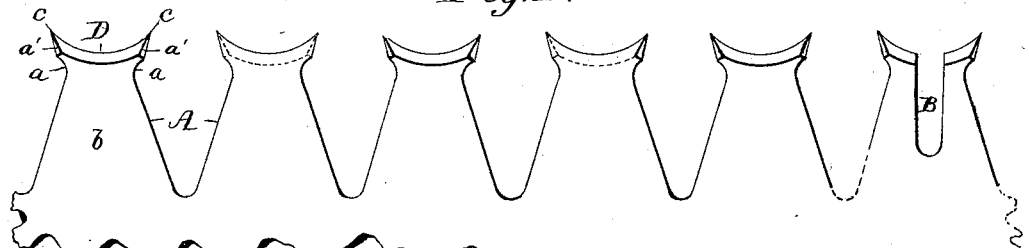

In Fig. 2 the shape of the point, as shown at $c$, differs from that in Fig. 1 only in being turned outward. This adaps it to hard wood.

Figure 4:
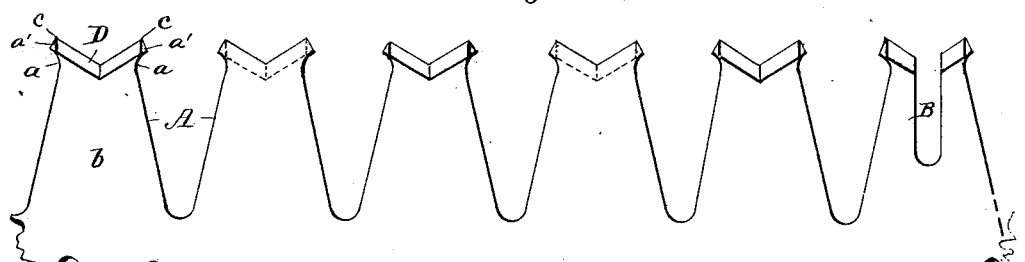
Figure 5:
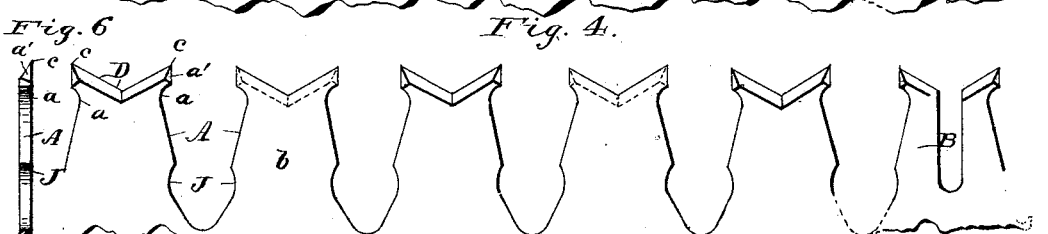

In Figs. 4 and 5 the concavity upon the ends D of the teeth, instead of being rounding, is formed by a re-entering angle, F, formed by two plane surfaces. This form is better adapted for small teeth, and permits a flat file to be used in sharpening. When the teeth are large, this form may be slotted, as shown at B in said figures.

In Fig. 5 I have shown below the concaves $a$ supplemental concaves J, which may be produced in the saw-blade in the course of manufacture, and saves labor in making repairs.

I am aware that the sides of saw-teeth have been concaved to take the place of set, and this is not claimed by me.

Having thus described my invention, what I claim, and desire to secure by Letters Patent of the United States, is—

1. A saw-tooth double-pointed, having bevels $a'$, and having concaves $a$ in proximity to the points, substantially as set forth.

2. A saw-tooth double-pointed, and having concaves $a$ in its opposite edges in proximity to the points and extending across the tooth from side to side, the edges of the tooth below the concaves being inclined toward each other, so that the tooth is narrower near its point than at its base, substantially as set forth.

3. A saw-tooth double-pointed, and having concaves $a$ in its opposite edges in proximity to the points and extending across the tooth from side to side, the tooth being also concaved upon its outer end, substantially as set forth.

4. A saw-tooth double-pointed, and having concaves $a$ in proximity to the points, said teeth having additional concaves J below the concaves $a$, substantially as described.

In testimony that I claim the foregoing as my invention I have signed my name, in presence of two witnesses, this 23d day of April, A. D. 1886.

EBEN MOODY BOYNTON.

Witnesses:
PATK. DUNN,
URIAH W. TOMPKINS.